United States Patent [19]

Kindt et al.

[11] Patent Number: 5,028,487

[45] Date of Patent: Jul. 2, 1991

[54] PRIMERLESS WATERPROOFING LAMINATES

[75] Inventors: Lawrence J. Kindt, Woodbine; James M. Gaidis, Ellicott City, both of Md.; Jay S. Kellett, Reading, Mass.

[73] Assignee: W. R. Grace & Co.-Conn., New York, N.Y.

[21] Appl. No.: 295,330

[22] Filed: Jan. 10, 1989

[51] Int. Cl.$^5$ .................... B32B 11/00; B32B 11/04
[52] U.S. Cl. ................................................ 428/489
[58] Field of Search ............... 428/489, 139, 246, 906, 428/40; 524/64, 59; 427/138; 366/194

[56] References Cited

U.S. PATENT DOCUMENTS

| | | | |
|---|---|---|---|
| 3,583,682 | 6/1971 | Bereata | 366/194 |
| 3,741,856 | 6/1973 | Hurst | 428/246 |
| 3,900,102 | 8/1975 | Hurst | 428/906 X |
| 4,172,830 | 10/1979 | Rosenberg | 428/489 X |
| 4,328,147 | 5/1982 | Chang | 524/59 |
| 4,442,148 | 4/1984 | Stierli | 428/40 |
| 4,459,157 | 7/1984 | Koons | 524/59 X |
| 4,547,399 | 10/1985 | Fujihara | 427/138 |
| 4,755,545 | 7/1988 | Lalwani | 524/64 |
| 4,766,024 | 8/1988 | Nath et al. | 428/139 |

FOREIGN PATENT DOCUMENTS

| | | | |
|---|---|---|---|
| 1230753 | 5/1971 | United Kingdom | 428/489 |
| 1400385 | 7/1975 | United Kingdom | 428/489 |
| 2052378B | 1/1981 | United Kingdom | 428/489 |

OTHER PUBLICATIONS

Brochure Entitled "Bituthene ® Waterproofing", Grace 8-1986.
Brochure Entitled "Ice & Water Shield TM", Grace, 1-1989.
Publication entitled "The Role of Bitumen in Blends with Thermoplastic Rubbers for Roofing Applications", Gossiwlligan, 5/1986.

*Primary Examiner*—Thomas J. Herbert
*Attorney, Agent, or Firm*—Chester Cekala; William L. Baker

[57] ABSTRACT

For waterproofing civil engineering structures using flexible, sheet-like waterproofing laminates which can be applied without primer to structures at temperatures of 40° F. and above. Primerless waterproofing laminates having a bituminous layer comprising 29 to 54 weight percent asphalt, 25 to 50 weight percent process oil, and 16 to 35 weight percent thermoplastic block polymer of styrene and butandiene monomers.

8 Claims, No Drawings

PRIMERLESS WATERPROOFING LAMINATES

BACKGROUND OF THE INVENTION

1. Field of the Invention

This invention relates to methods for waterproofing or dampproofing various water-penetrable construction materials in which improved, pre-formed, flexible sheet-like waterproofing laminates are applied to structures without application of primer. Included in this invention are improved, pre-formed, flexible sheet-like waterproofing laminates which are primerless when applied to various buildings and other civil engineering structures.

2. Description of Related Art

Various materials used in building construction and other civil engineering projects such as roads, bridges, buildings, foundations, and plaza decks are susceptible to water penetration resulting, in part, from their inherent properties. Reducing or eliminating water penetration through structures formed of these materials often is desirable and may be critical in certain structures such as those housing sensitive electronic equipment or tunnels moving vehicular or pedestrian traffic under bodies of water. For many years, flexible, sheet-like waterproofing laminates of support films and bituminous layers pre-formed in a factory have been employed as water-proofing agents.

Although pre-formed, flexible sheet-like water-proofing laminates of support films and bituminous layers have been used for many years, the disadvantage of having to apply primer to the structure surface before application of waterproofing laminates, at least at application temperatures of about 40° F. to 70° F., has yet to be overcome. For example, waterproofing laminates applied to vertical aspects of structures, such as subterranean basements, must adhere to the structure without additional support for the time interval between application and backfill and, thereafter, must remain securely bonded to the structure to prevent migration of any water that might enter through damaged areas of the waterproofing laminate. Also, even though resistance to gravity is not a factor in horizontal applications, waterproofing laminates applied to horizontal surfaces must remain securely bonded to prevent migration of any water that might contact these surfaces. Despite the costs, delays, and safety concerns associated with primer application, however, sufficient adherence to structures using currently available waterproofing laminates, at least at application temperatures of about 40° F. to 70° F., requires initial structure priming.

Flexible, pre-formed laminates of the type mentioned above and their use to form waterproofing layers in various kinds of building structures are described in, for example, U.S. Pat. Nos. 3,741,856; 3,583,682; and 3,900,102 to Hurst. U.S. Pat. No. 4,172,830 to Rosenberg et al. is another of many examples disclosing sheet-like flexible materials used for waterproofing.

U.S. Pat. No. 4,755,545 to Lalwani describes a self-sealing roofing adhesive blend including 50-95% by weight of a bituminous component, 4-40% by weight of an inert filler, and 1-6% by weight of a thermoplastic block polymer of styrene and butadiene monomers.

U.S. Pat. No. 4,547,399 to Fujihara et al. discloses a composition effective for sealing cracks and joints in asphalt and concrete streets and highways that includes paving grade asphalt, process oil (not over 32%), and styrene-butadiene rubber or rubbers.

U.S. Pat. Nos. 4,328,147 and 4,382,989 to Chang et al. describe asphaltic compositions useful as roofing asphalts which include 39-99% by weight of oxidized asphalt and from 1-8% oxidized polyethylene.

U.S. Pat. No. 4,459,157 to Koons describes a composition of an asphalt blend in which a butadiene-styrene elastomeric block copolymer is dispersed and contains 5-45% by weight of catalytic petroleum cracker bottoms oil. This composition is characterized further by a low asphaltene content.

SUMMARY OF THE INVENTION

The present invention relates to methods for waterproofing certain water-penetrable construction materials comprising application of improved pre-formed, flexible, sheet-like, primerless waterproofing laminates to structures without prior primer application. The improved pre-formed, flexible, sheet-like laminates used in the invented methods are comprised of support films and bituminous layers in which the bituminous component includes 29-54 weight percent asphalt, 25-50 weight percent process oil, and 16-35 weight percent of a thermoplastic block polymer of styrene and butadiene monomers.

DETAILED DESCRIPTION OF THE INVENTION

Optimum waterproofing of structures such as buildings, bridges, roads, tunnels, foundations, and plaza decks using pre-formed, flexible, sheet-like laminates of film and bituminous layers requires bonds between the structure and waterproofing laminate which endure essentially for the life of the structure. Such enduring bonds even are important in applications such as subterranean basements, where backfill would hold the waterproofing laminate in place and horizontal applications where gravity would hold the waterproofing laminate in place to prevent migration along the structure surface of water which may enter through any damaged areas of the waterproofing laminate. To achieve enduring bonds between structures and currently available waterproofing laminates, primers must be applied prior to application of the waterproofing laminate.

The present invention resides in the discovery of improved waterproofing laminates having a bituminous layer comprised of about 29 to 54% by weight asphalt, about 25 to 50% by weight process oil, and about 16 to 35% by weight of a thermoplastic block polymer of styrene and butadiene monomers. As used herein, the weight percent of asphalt, process oil, and thermoplastic block polymer of butadiene and styrene is calculated based on the total of these components not including fillers or any other components. Further, at least at temperatures between about 40° F. and 70° F. and above, because application of such laminates to structures yields sufficiently strong and enduring laminate-structure bonds even without prior primer application, use of the improved waterproofing laminates obviates the necessity and disadvantages of prior primer application. Thus, the invented primerless waterproofing laminates are waterproofing laminates which when applied to unprimed structures at temperatures above 40° F., preferably from 40° F. to 70° F., more preferably 40° F. to 60° F., form sufficiently strong and enduring waterproofing laminate-structure bonds to meet relevant construction industry specifications and standards. The specifications and standards are known by and readily accessible to those skilled in the art. Moreover, the invented primerless waterproofing laminates retain sufficient high temperature flow resistance to enable application where temperatures may exceed 140° F. such as on plaza decks of buildings located in hot climates.

As used herein, waterproofing laminates are flexible, sheet-like materials comprising a bituminous layer such as asphalt, rubberized asphalt, or equivalent materials, and a support material, preferably a film of a synthetic polymer such as polyethylene, polypropylene or other polyolefin; polyamide; polyester, e.g., polyethylene terephthalate, polyurethane, polyvinyl chloride; a copolymer of vinyl chloride and vinylidene chloride; synthetic rubber such as polychloroprene or butyl rubber; or other similar materials. Preferably, the bituminous layer is at least 25 mils thick, more preferably from 50-60 mil thick. Thus, waterproofing laminates do not include materials such as roofing felts wherein a bituminous material is impregnated into a support mat made of, for example, fiberglass, cellulosic materials, organic polymers, felt, or other materials to which asphalt will adhere. As used herein, waterproofing laminate primers are compositions which are applied to a structure prior to application of waterproofing laminates and which are intended to leave a residue on the structure. Such primers include known waterproofing laminate primers such as compositions of asphalt cutbacks, natural or synthetic rubbers, and diluent or filler resins in organic solvents, and primer application refers to application of such primers to a structure before application of a waterproofing laminate. Removing dirt or other foreign matter from the structure by mechanical means or using a solvent that leaves no substantial residue present when the waterproofing laminate is applied is not primer application or priming as used herein.

The asphalt used in the invented, improved waterproofing laminates has the following alumina separation (ASTM D4124) ranges and preferred ranges:

|  | Range | Preferred Range |
| --- | --- | --- |
| Saturates | 5-25% | 8-15% |
| Naphthenic Aromatics | 20-40% | 32-40% |
| Polar Aromatics | 30-50% | 40-46% |
| Asphaltenes | 5-20% | 8-15% |

The process oil used in the bituminous layer of the presently invented waterproofing laminates is operative process oil defined as a generally naphthenic, aliphatic, or naphthenic-aliphatic oil which has the following clay gel separation (ASTM D2007) range:

| Saturates | 10-30% |
| --- | --- |
| Polar Compounds | 10-20% |
| Aromatics | 50-85% |
| Asphaltenes | 0-0.5% |

The thermoplastic block polymer of styrene and butadiene monomers is selected using known procedures so that the resulting bituminous layer has sufficient strength and tackiness to produce primerless waterproofing laminates. Preferred thermoplastic block polymers of styrene and butadiene monomers are mixtures of polymers having a butadiene:styrene ratio of about 70:30 and a block polystyrene content of about 30% (high molecular weight polymer) and polymers having a butadiene:styrene ratio of about 75:25 and a block polystyrene content of about 18% (low molecular weight polymer). More preferred are polymers in which the ratio of the low molecular weight polymer to the high molecular weight polymer is in the range of 5:1 to 1:1. Most preferred are polymers wherein the ratio of the low molecular weight polymer to the high molecular weight polymer is about 3.8:1 or 2:1.

Preferred waterproofing laminates of this invention include a bituminous layer comprising about 41-54 weight percent, more preferably about 47-52 weight percent asphalt; 30-40 weight percent, more preferably about 30-35 weight percent process oil; and about 18-35 weight percent, more preferably about 18-25 weight percent thermoplastic block polymer of styrene and butadiene monomers.

Fillers are optional ingredients in the bituminous layer of the invented waterproofing laminates. Useful fillers include stone dust, lime stone, ground glass fibers, wollastonite, sand, talc, mica, vermiculite, carbon black, and titanium dioxide. Addition of fillers and various other optional ingredients, however, may reduce the ability of the invented waterproofing laminates to adhere to unprimed structures. Thus, the types and amounts of fillers are selected so that the waterproofing laminate forms sufficiently strong and enduring bonds with the substrate when applied without primer as determined by the testing procedure described below.

A presently preferred composition for the bituminous layer of waterproofing laminates for primerless application comprises about 49 weight percent asphalt having the above described alumina separation range, about 30 weight percent process oil having the above described clay gel separation range, about 21 weight percent thermoplastic block polymer of styrene and butadiene monomers, and up to 5 weight percent filler. More preferred is this composition wherein the thermoplastic block polymer is an about 2:1 ratio of the low molecular weight and high molecular weight polymers.

Another presently preferred composition for the bituminous layer of waterproofing laminates for primerless application comprises about 48 weight percent asphalt having the above described alumina separation range, about 32.75 weight percent process oil having the above described clay gel separation range, and about 19.25 weight percent thermoplastic block polymer of styrene and butadiene monomers wherein the thermoplastic block polymer is an about 3.8:1 ratio of the low to high molecular weight polymers.

Various civil engineering structures including, for example, buildings, bridges, roads, and tunnels, are made waterproof using the present invention. As used herein, making a structure "waterproof" means reducing or eliminating the ability of water to penetrate the structure. The presently invented waterproofing laminates are used to make waterproof structures constructed of materials which are water-penetrable either inherently or as a result of imperfections such as cracks or pores. The types of water-penetrable materials with which the present invention is used include brick, stone, exterior gypsum board, blended cements, pozzolanic cements, or concrete, preferably Portland cement concrete.

The presently invented waterproofing laminates are prepared according to the following general procedure. Previously powdered or ground thermoplastic polymer of styrene and butadiene monomers is added to process oil heated to approximately 350°-400° F. and mixed until no polymer particles are apparent. Thereafter, asphalt is added to the polymer-oil blend with mixing until a uniform composition has formed. This polymer-oil-asphalt composition then is poured onto release paper and covered with a support film. Alternatively, the polymer-oil-asphalt composition is prepared by adding thermoplastic polymer to a mixture of process oil and asphalt heated to about 350°–400° F.

According to the presently invented methods for waterproofing structures using the invented waterproofing laminates without primer, the waterproofing laminate is applied to the structure with pressure. Preferably, pressure greater than hand pressure, for example, using a roller, is used. In preferred methods the invented waterproofing laminates are applied to vertical aspects of structures such as foundations. In other preferred methods, the invented waterproofing laminates are applied to horizontal aspects of structures, such as plaza decks. The structure to which the waterproofing laminate is applied should not have excessive amounts of mud or other contaminates. Preferably, prior to application of the waterproofing laminate, any contaminates on the structure are removed by, for example, using air, vacuum, or are removed by mechanical means such as brushing.

As used in the invented methods, application of waterproofing laminates without primer at temperatures above 40° F., preferably between about 40° F. and 70° F., more preferably between about 40° F. and 60° F., results in substrate-waterproofing laminate bonds that are sufficiently strong and enduring to prevent entry of water along the waterproofing laminate edges and migration of water entering from any damaged areas of the waterproofing laminate essentially for the life of the structure. At some selected application temperatures, for example about 40° F. to 70° F., currently available waterproofing laminates may adhere to structures when applied without primer but the bonds which form are insufficiently strong and enduring to prevent water entry or migration for the life of the structure and often are not strong enough to support vertically applied waterproofing laminate until backfilled. Thus, primerless application at least at temperatures between 40° F. and 70° F. of currently available waterproofing laminates does not meet relevant construction industry specifications and standards.

The Example 6 test procedure was selected to predict actual use requirements and used to identify waterproofing laminates which when applied to structures without primer yield structure-waterproofing laminate bonds of sufficient strength and duration to meet relevant construction industry specifications and standards. When measured at about 15 minutes following application at 40° F. to pasted block, a peel force of 2.0 pounds per linear inch approximates the minimum needed for waterproofing laminate structure bonds of sufficient strength and duration for the tested waterproofing laminate to be primerless.

Contemplated equivalents of the present invention include waterproofing laminates having similar asphalt-polymer compositions which at temperatures of about 40° F.–70° F. can be applied to structures without primers and produce sufficiently strong and enduring waterproofing laminate-structure bonds to meet construction industry waterproofing specifications and standards. Other contemplated equivalents are waterproofing laminates having a bituminous layer and a support film wherein some part of the bituminous layer is impregnated into the support film.

The following examples provide specific illustrations of the invention, but are not intended to limit the scope of the invention as described above and claimed below.

EXAMPLE 1

Process oil (180g) having clay gel separation (ASTM D2007) range as stated above and asphalt (294 g) having the alumina separation (ASTM D4124) range stated above was heated to 350° F.–400° F. using a heating mantle. Then 42 g of powdered (passes 10 mesh sieve) styrene-butadiene rubber having a 70:30 butadiene:styrene ratio and a block polystyrene content of 30% was added slowly to avoid lumping and mixed with a paddle mixer. Next, 84 g of ground (passes 4 mesh sieve) styrene-butadiene rubber having a 75:25 butadiene:styrene ratio and a block polystyrene content of 18% slowly was added and mixed for 30–60 Minutes. This rubberized asphalt then was poured onto release paper at a thickness of approximately 56 mils and covered with polyethylene film.

EXAMPLE 2

Process oil (228 g) having clay gel separation (ASTM D2007) range as stated above was heated to 350° F.–400° F. using a heating mantle. Then 42 g of powdered (passes 10 mesh sieve) styrene-butadiene rubber having a 70:30 butadiene:styrene ratio and a block polystyrene content of 30% was added slowly to avoid lumping and mixed with a paddle mixer. Next, 84 g of ground (passes 4 mesh sieve) styrene-butadiene rubber having a 75:25 butadiene:styrene ratio and a block polystyrene content of 18% slowly was added and mixed for 30–60 Minutes. This oil and rubber mixture then was mixed until no rubber particles were apparent, usually from 30 minutes to 3 hours. Then 240 g asphalt at 300° F.–350° F. was added and mixed for 30 to 60 minutes. This rubberized asphalt then was poured onto release paper at a thickness of approximately 56 mils and covered with polyethylene film.

EXAMPLE 3

Using the process of Example 5, a waterproofing laminate having a bituminous layer consisting of process oil (456 g) having the above described clay gel separation (ASTM D2007) range, high molecular weight polymer (84 g), low molecular weight polymer (168 g), and asphalt (492 g) having the above described alumina separation (ASTM D4124) range was prepared.

EXAMPLE 4

Using the process of Example 5, a waterproofing laminate having a bituminous layer consisting of process oil (360 g) having the above described clay gel separation (ASTM D2007) range, high molecular weight polymer (84 g), low molecular weight polymer (168 g), and asphalt (588 g) having the above described alumina separation (ASTM D4124) range was prepared.

EXAMPLE 5

Process oil (393 g) having the above clay gel separation (ASTM D2007) range, 48 g of styrene-butadiene rubber having a 70:30 butadiene:styrene ratio and a block polystyrene content of 30%, and 183 g of a styrenebutadiene rubber having a 75:25 butadiene-styrene ratio and a block polystyrene content of 18% was mixed at about 300 to 350° F. for about one hour. Thereafter asphalt (576 g) having the above alumina separation (ASTM D4124) range was added and mixed for thirty minutes. Mixing is performed under argon gas to reduce oxidation. Then, the rubberized asphalt thus prepared is poured onto release paper at a thickness of approximately 56 mils and covered with polyethylene film.

The following procedure was used to test concrete adhesion of the waterproofing laminate of this example and Examples 3 and 4. In this testing procedure, 3.75" wide×7.5" long×2.25" high porous extruded concrete blocks are used as the testing structure. Waterproofing laminate samples are cut into approximately 3"×7" strips. About 1" of the release paper is removed from one of the shorter edges and replaced by masking tape. Then the laminate samples and blocks are stored for about two hours at the adhesion testing temperature.

Release paper then is removed from the samples, and these samples are applied smoothly to the testing blocks. The samples next are rolled three times with a 5" wide, 28 pound steel roller. Then the blocks with laminate samples attached are stored at the testing temperature. Next, the mechanical jaws of a physical tester (Instron ®) are attached to the laminate sample taped tabs and the tester is run crosshead (90°) at 2 inches per minute. The average force (pounds/inch width of laminate) then is computed and displayed in Table I:

TABLE I

| Sample | Peel Force (lb/in) | |
|---|---|---|
| | 40° F. | 100° F. |
| Example 3 | 0.8 | 1.9 |
| Example 4 | 1.5 | 1.0 |
| Example 5 | 1.6 | 2.4 |

EXAMPLE 6

Adhesion Testing

The following procedure also was used to measure waterproofing laminate adhesion to structures. In this procedure, porous block and pasted block were used as testing structures. Porous block is porous extruded concrete block 3¾" wide×7½" long×2¼" high. Pasted block is porous block coated with a cement paste consisting of 1 part ordinary Portland cement mixed with 2 parts water. The cement paste is brushed on the porous block forming a smooth surface. The pasted blocks then are moist cured for seven days and room-dried for at least seven days.

Waterproofing laminate samples containing a bituminous layer having release paper affixed on one major-surface and support film affixed on the other major surface is cut in strips approximately 2"×7". Approximately 1" of the release paper is removed from one of the shorter edges and replaced by masking tape to form a tab. The laminate samples and blocks then are aged for two hours at the temperature at which adhesion testing is to be performed.

Release paper then is removed from the laminate samples, and these samples are applied smoothly to one of the testing blocks. After block application the laminate samples are rolled three times with a 2⅜" wide 20-pound steel roller. The blocks with laminate samples attached then are aged for 15 minutes at the testing temperature. Next, the mechanical jaws of a physical tester (Sintech ®) are attached to the laminate sample tabs and the physical tester is run crosshead (90°) at 2"/min. Then the average force (pounds/inch width of laminate sample) at which the laminate sample is peeled from the block is computed.

Testing using this procedure yielded the data in Table I, below. In the Table, Controls 1 and 2 are commercially available waterproofing laminates having a bituminous layer comprising asphalt, process oil, rubber, and filler.

TABLE II

| Sample | Structure | Peel Force (lb/in) | | | |
|---|---|---|---|---|---|
| | | 20° F. | 40° F. | 60° F. | 80° F. |
| Example 1 | Pasted Block | 1.9 | 3.4 | 4.1 | 4.0 |
| | Porous Block | 1.0 | 2.3 | 4.8 | 4.8 |
| Example 2 | Pasted Block | 5.2 | 3.6 | 4.2 | 3.6 |
| | Porous Block | 2.1 | 2.2 | 3.6 | 4.7 |
| Control 1 | Pasted Block | 0.6 | 0.9 | 2.7 | 3.0 |
| | Porous Block | 0.2 | 0.3 | 1.3 | 2.3 |
| Control 2 | Pasted Block | 0.3 | 1.3 | 1.3 | 3.8 |
| | Porous Block | 0.3 | 0.6 | 1.1 | 2.1 |

EXAMPLE 7

High Temperature Flow Resistance

The following procedure was used to test high temperature flow resistance of the invented primerless waterproofing laminates. Initially, 2" wide, 3" long, 56 mil thick samples of the bituminous layer (without support film) of the waterproofing laminates was affixed to 20 gauge steel sheet. Then the steel sheet with bituminous layer affixed is conditioned horizontally at test temperature for one hour. Thereafter, the steel sheet is maintained vertically at testing temperatures for the test. After the test, the maximum sag or drippage point at the bottom of each sample is measured.

TABLE III

| Sample | Temperature/Time (cm) | | |
|---|---|---|---|
| | 24 Hours | | 48 Hours |
| | 160° F. | 180° F. | 160° F. |
| Example 1 | 0.0 | 0.7 | 0.0 |
| Example 2 | 1.1 | 6.9 | 1.1 |
| Control 1* | 3.6 | >15.4 | 6.8 |
| Control 2* | 2.7 | >15.4 | 5.5 |

*Controls 1 and 2 are the same as in Example 6

EXAMPLE 8

Slow Peel Testing

A section of galvanized steel is sprayed with a spray adhesive, and a piece of cross-laminated polyethylene film is placed on the adhesive. The steel with film attached then is allowed to dry overnight. A 56 mil thick section of a waterproofing laminate bituminous layer is applied to a backing material and cut in about 3" wide×7" long strips. A 1 inch wide piece of tape is affixed to one of the 3" wide edges. This bituminous layer test sample then is applied to the polyethylene film attached to the steel and rolled three times with a 28-pound steel roller. The steel with bituminous layer attached then is maintained horizontally for one hour. Thereafter, the sample is placed vertically with the taped tab at the top, a 100 g weight is attached to the tab, and the sample is maintained at 120° F. for the testing period. Testing of the bituminous layers of Examples 3, 4, and 5 yielded the data in Table IV:

TABLE IV

| Sample | Peel Distance (cm) at 1 hr. |
|---|---|
| Example 3 | 1.6 |
| Example 4 | 2.7 |

TABLE IV-continued

| Sample | Peel Distance (cm) at 1 hr. |
|---|---|
| Example 5 | 0.4 |

The preferred embodiments of the invention are illustrated by the above. However, the invention is not limited to the instructions disclosed herein, and the right to all modifications within the scope of the following claims is reserved.

We claim:

1. A primerless waterproofing laminate consisting of a bituminous layer on a support film wherein the bituminous layer comprises:

29 to 54 weight percent asphalt having the following alumina separation (ASTM D4124) range:

| Saturates | 5-25% |
|---|---|
| Naphthenic Aromatics | 20-40% |
| Polar Aromatics | 30-50% |
| Asphaltenes | 5-20%; |

25 to 50 weight percent process oil having the following clay gel separation (ASTM D2007) range:

| Saturates | 10-30% |
|---|---|
| Polar Compounds | 10-20% |
| Aromatics | 50-85% |
| Asphaltenes | 0-0.5%; and |

16 to 35 weight percent thermoplastic block polymer of styrene and butadiene monomers comprising a mixture of a polymer having a polystyrene:butadiene ratio of about 70:30 and a block polystyrene content of about 30% (high molecular weight polymer) and a polymer having a polystyrene:butadiene ratio of about 75:25 and a block polystyrene content of about 18% (low molecular weight polymer) wherein the ratio of low molecular weight polymer to high molecular weight polymer is in the range of 5:1 to 1:1.

2. A primerless waterproofing laminate of claim 1 in which the asphalt has the following alumina separation range:

| Saturates | 8-15% |
|---|---|
| Naphthenic Aromatics | 32-40% |
| Polar Aromatics | 40-46% |
| Asphaltenes | 8-15% |

3. A primerless waterproofing laminate of claim 1 having 41 to 54 weight percent asphalt, 30 to 40 weight percent process oil, and 18 to 35 weight percent thermoplastic polymer of styrene and butadiene monomers.

4. A primerless waterproofing laminate of claim 3 having 47 to 52 weight percent asphalt, 30 to 35 weight percent process oil, and 18 to 25 weight percent thermoplastic polymer of styrene and butadiene monomers.

5. A primerless waterproofing laminate of claim 1 wherein the ratio of low molecular weight polymer to high molecular weight polymer is 2:1.

6. A primerless waterproofing laminate of claim 5 having 49 weight percent asphalt, 30 weight percent process oil, and 21 weight percent thermoplastic polymer of styrene and butadiene monomers.

7. A primerless waterproofing laminate of claim 1 wherein the ratio of low molecular weight polymer to high molecular weight polymer is 3.8:1.

8. A primerless waterproofing laminate of claim 7 having 48 weight percent asphalt, 32.75 weight percent process oil, and 19.25 weight percent thermoplastic block polymer of styrene and butadiene monomers comprising a mixture in a 3.8:1 ratio of a polymer having a styrene:butadiene ratio of 75:25 and a block polystyrene content of 18% and a polymer having a styrene:butadiene ratio of 70:30 and a block polystyrene content of 30%.

* * * * *